United States Patent Office 2,972,623
Patented Feb. 21, 1961

2,972,623

17-OXYGENATED-18,19-DINORANDROST-4-EN-3-ONES

William F. Johns, Morton Grove, Ill., assignor to G. D. Searle & Co., Chicago, Ill., a corporation of Delaware No Drawing. Filed Apr. 16, 1959, Ser. No. 806,764

4 Claims. (Cl. 260—397.3)

The present invention relates to novel steroidal compounds which contain a polyhydrocyclopentanophenanthrene ring structure but are lacking the characteristic $C_{10}$- and $C_{13}$-methyl groups. More particularly, the compounds of this invention are 17-oxygenated-18,19-dinorandrost-4-en-3-ones and intermediates in the manufacture of same. The former group of compounds can be represented by the structural formula

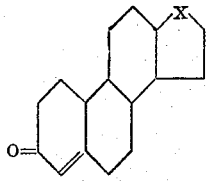

wherein X is selected from the group consisting of carbonyl, hydroxymethylene, and (lower alkanoyl)oxymethylene radicals. The term "lower alkanoyl" encompasses, for example, formyl, acetyl, propionyl, butyryl, valeryl, caproyl, enanthyl, and caprylyl radicals, said groups being the acyl radicals of alkanoic acids containing fewer than 9 carbon atoms.

A suitable starting material for the manufacture of the compounds of this invention is 3-methoxy-18-nor-1,3,5-(10)-estratrien-17-ol. By reducing that substance, for example with lithium and liquid ammonia, 3-methoxy-18-nor-2,5(10)-estradien-17-ol is obtained. Hydrolysis of the latter enol ether, as exemplified by reaction with aqueous oxalic acid, affords 17-hydroxy-18-norestr-5(10)-en-3-one which can be isomerized, preferably in methanol with hydrochloric acid, to yield 17-hydroxy-18,19-dinorandrost-4-en-3-one.

The aforementioned starting material, 3-methoxy-18-nor-1,3,5(10)-estratrien-17-ol, can be prepared from estradiol 3-methyl ether by the following sequence of reactions. Estradiol 3-methyl ether is treated first with boric acid at an elevated temperature then with a double bond splitting agent such as ozone, to afford 1-(3-oxobutyl)-7-methoxy-1,2,3,4,4a,9,10,10a-octahydrophenanthren-2-one. Cyclization of the latter substance, for example by reaction in methanol with aqueous potassium hydroxide, results in 12a-hydroxy-8-methoxy-1,2,3,4,4a,4b,5,6,10b,11,12,12a-dodecahydrochrysen-2-one which is then dehydrated, for example by further treatment with aqueous potassium hydroxide in methanol, to yield 8-methoxy-2,3,4,4a,4b,5,6,10b,11,12 - decahydrochrysen-2-one. Reduction of the latter substance, preferably with lithium and liquid ammonia, affords 8-methoxy-1,2,3,4,4a,4b,5,6,7,10,10b,11,12,12a-tetradecahydrochrysen-2-ol. Oxidation of the latter alcohol, as exemplified by treatment with chromic acid, affords 8-methoxy-1,2,3,4,4a,4b,5,6,10b,11,12,12a-dodecahydrochrysen-2-one. Reaction of the latter ketone with methyl magnesium bromide followed by hydrolysis of the Grignard addition product yields a mixture of epimeric 2-methyl-8-methoxy-1,2,3,4,4a,4b,5,6,10b,11,12,12a-dodecahydrochrysen-2-ols which is dehydrated, preferably by reaction with thionyl chloride, to yield 2-methyl-8-methoxy-1,4,4a,4b,5,6,10b,11,12,12a-decahydrochrysene. Cleavage of the isolated double bond of the latter compound, preferably by ozonolysis, affords 1-formylmethyl-2-(2-oxopropyl)-7-methoxy-1,2,3,4,4a,9,10,10a-octahydrophenanthrene, which is then cyclized, for example by treatment with aqueous potassium hydroxide, to yield 3-methoxy-18,19-dinor-1,3,5(10),16-pregnatetraene-20-one. Elimination of the 17-acetyl side chain of the latter compound, for example by treatment with hydroxylamine followed by reaction with phosphorous oxychloride, results in 3-methoxy-18-nor-1,3,5(10)-estratrien-17-one. The latter ketone is reduced, for example with lithium aluminum hydride in ether, to afford 3-methoxy-18-nor-1,3,5(10)-estratrien-17-ol.

Oxidation of 17-hydroxy-18,19-dinorandrost-4-en-3-one results in 18,19-dinorandrost-4-ene-3,17-dione, also a compound of this invention.

The 17-(lower alkanoyl)oxy-18,19-dinorandrost-4-en-3-ones of this invention can be manufactured by treating the aforementioned 17-hydroxy-18,19-dinorandrost-4-en-3-one with a lower alkanoic acid anhydride in the presence of a suitable acid acceptor. As a specific example, reacting the latter alcohol in pyridine with acetic anhydride results in 17-acetoxy-18,19-dinorandrost-4-en-3-one.

The compounds of this invention are useful as a result of their valuable pharmacological properties. They have, for example, the capacity to inhibit the sodium-retaining effect of desoxycorticosterone acetate. In the latter respect they are much more effectual than their prior art homologs. Specifically, 18,19-dinor-testosterone (17β-hydroxy-18,19-dinorandrost-4-en-3-one) is about 11–12 times as potent as testosterone and about 6–7 times as potent as 19-nortestosterone in its antidesoxycorticosterone acetate activity.

This invention will appear more fully from the examples which follow. These examples are set forth by way of illustration only and it will be understood that the invention is not to be construed as limited in spirit or in scope by the details contained therein, as many modifications in materials and methods will be apparent in this disclosure to those skilled in the art. In these examples temperatures are given in degrees centigrade (° C.). Quantities of materials are expressed in parts by weight and in parts by volume which bear the same relation one to the other as kilograms to liters.

EXAMPLE 1

*1-(3-oxobutyl)-7-methoxy-1,2,3,4,4a,9,10,10a-octahydrophenanthren-2-one*

A mixture of 100 parts by weight of estradiol 3-methyl ether and 25 parts by weight of boric acid is heated at 140° for 20 minutes. Distillation of the reaction mixture at reduced pressure yields a colorless oil.

The colorless oil is dissolved in a solution of 400 parts by volume of methylene chloride and 400 parts by volume of methanol and a stream of oxygen containing one equivalent of ozone is passed through at −70°. To this reaction mixture is added 40 parts by weight of zinc dust followed by 40 parts by volume of acetic acid and the temperature allowed to rise to 0° with efficient stirring. After 45 minutes the mixture is filtered, water and aqueous sodium bicarbonate added to the filtrate, and the latter extracted with chloroform. The chloroform extract is stripped of solvent in vacuo and the residue crystallized from acetone, yielding 1-(3-oxobutyl)-7-methoxy-1,2,3,4,4a,9,10,10a-octahydrophenanthren - 2 - one, M.P. 119–120°, $[\alpha]_D = 98°$.

EXAMPLE 2

*12a-hydroxy-8-methoxy-1,2,3,4,4a,4b,5,6,10b,11,12,12a-dodecahydrochrysen-2-one*

To a solution of 6 parts by weight of 1-(3-oxobutyl)-7- methoxy-1,2,3,4,4a,9,10,10a-octahydrophenanthren-2-one in 600 parts by volume of methanol is added 60 parts by volume of 1% aqueous potassium hydroxide. The reaction mixture is allowed to stand at room temperature for 10 minutes, then diluted with water and extracted with benzene. The benzene extract is washed with water, dried over anhydrous magnesium sulfate and concentrated to dryness under reduced pressure. Chromatography of the residue by adsorption on silica gel and elution with a 10% ethyl acetate-90% benzene solution affords pure 12a-hydroxy-8-methoxy-1,2,3,4,4a,4b,5,6,-10b,11,12,12a - dodecahydrochrysen-2-one, M.P. 197–200°.

EXAMPLE 3

*8-methoxy-2,3,4,4a,4b,5,6,10b,11,12-decahydrochrysen-2-one;*

A solution of 54.9 parts by weight of 12a-hydroxy-8-methoxy - 1,2,3,4,4a,4b,5,6,10b,11,12,12a - dodecahydrochrysen-2-one in 2200 parts by volume of methanol and 350 parts by volume of 10% aqueous potassium hydroxide is heated at reflux under nitrogen for 1 hour. The solution is cooled and diluted with water and the resulting precipitate washed with water and dried, yielding 8-methoxy - 2,3,4,4a,4b,5,6,10b,11,12-decahydrochrysen-2-one, M.P. 145–146°; $[\alpha]_D = +85°$.

EXAMPLE 4

*8-methoxy-1,2,3,4,4a,4b,5,6,7,10,10b,11,12,12a-tetra-decahydrochrysen-2-ol*

A solution of 46.7 parts by weight of 8-methoxy-2,3, 4,4a,4b,5,6,10b,11,12-decahydrochrysen-2-one in 700 parts by volume of tetrahydrofuran is added to a solution of 1600 parts by volume of anhydrous liquid ammonia in 700 parts by volume of t-butanol over a period of 1 hour. During the same period a total of 32 parts by weight of lithium wire in portions of 5 parts by weight is also added. When the solution loses its color, after about 4 hours, the ammonia is evaporated and water added cautiously. The mixture is extracted with benzene and the benzene extract washed with water, dried over anhydrous sodium sulfate and concentrated to dryness, yielding 8-methoxy-1,2,3,4,4a,4b,5,6,7,10,10b,11,12,12a-tetradecahydrochrysen-2-ol, M.P. 180–182°.

EXAMPLE 5

*8-methoxy-1,2,3,4,4a,4b,5,6,10b,11,12,12a-decahydrochrysen-2-one*

A solution of 37.6 parts by weight of 8-methoxy-1,2,3, 4,4a,4b,5,6,7,10,10b,11,12,12a - tetradecahydrochrysen-2-ol in 400 parts by volume of pyridine is added to a solution of 40 parts by weight of chromium trioxide in 400 parts by volume of pyridine at 10°. The solution is allowed to stand overnight at room temperature, diluted with water and extracted with ether. The ether extract is washed with water, dried over anhydrous sodium sulfate, and concentrated to dryness, yielding 8-methoxy-1,2,3,4,4a,4b,5,6,10b,11,12,12a - dodecahydrochrysen-2-one, M.P. 188–190°; $[\alpha]_D = +31°$.

EXAMPLE 6

*2-methyl-8-methoxy-1,4,4a,5,6,10b,11,12,12a-decahydrochrysene*

To a solution of 4 parts by weight of 8-methoxy-1,2,3, 4,4a,4b,5,6,10b,11,12,12a - dodecahydrochrysen-2-one in 40 parts by volume of tetrahydrofuran and 1000 parts by volume of anhydrous ether is added 15 parts by volume of 3 molar methyl magnesium bromide in n-butyl ether. The mixture is stirred at reflux for 15 minutes and another portion of 15 parts by volume of the Grignard solution is added. The mixture is stirred at reflux for two hours longer, is then cooled and diluted with water and excess hydrochloric acid. The solution is extracted with benzene and the benzene extract washed with aqueous sodium bicarbonate solution, dried over anhydrous sodium sulfate and concentrated to dryness in vacuo. Crystallization of the residue from ether yields a mixture of epimeric 2-methyl-8-methoxy-1,2,3,4,4a,4b, 5,6,10b,11,12,12a-dodecahydrochrysen-2-ols.

To a solution of 38 parts by weight of the above epimeric mixture in 40 parts by volume of pyridine at 0° is added a solution of 15 parts by volume of thionyl chloride dissolved in 40 parts by volume of pyridine at 0°. The reaction mixture is stirred for 1 hour at 0°, then water and aqueous potassium bicarbonate cautiously added. The mixture is extracted with chloroform, the extract washed first with aqueous potassium bicarbonate then with water, dried over anhydrous sodium sulfate and concentrated to dryness in vacuo. Chromatography of a petroleum ether solution of the residue on 400 parts by weight of silica gel followed by elution with 10% benzene in petroleum ether yields 2-methyl-8-methoxy-1,4,4a,4b,5,6,10b,11,12,12a - decahydrochrysene, M.P. 124–125°; $[\alpha]_D = -36°$

EXAMPLE 7

*1-formylmethyl-2-(2-oxopropyl)-7-methoxy-1,2,3,4,4a, 9,10,10a-octahydrophenanthrene*

A stream of oxygen containing one equivalent of ozone is passed through a solution of 0.57 part by weight of 2 - methyl - 8 - methoxy - 1,4,4a,4b,5,6,10b,11,12,12a-decahydrochrysene in 50 parts by volume of methylene chloride and 50 parts by volume of methanol at −70°. To this reaction mixture is added 3 parts by weight of zinc dust and 3 parts by volume of acetic acid and the mixture stirred with cooling by means of an ice-bath for 10 minutes. The filtered solution is washed with water and aqueous potassium bicarbonate, dried over anhydrous sodium sulfate and concentrated to dryness in vacuo. Crystallization from benzene-petroleum ether yields 1-formylmethyl-2-(2-oxopropyl)-7-methoxy-1,2,3,4, 4a,9,10,10a-octahydrophenanthrene, M.P. 143–143.5°.

EXAMPLE 8

*3-methoxy-18,19-dinor-1,3,5(10),16-pregnatetraen-20-one*

A suspension of 8.42 parts by weight of 1-formylmethyl - 2 - (2 - oxopropyl) - 7 - methoxy - 1,2,3,4,9, 10,10a-octahydrophenanthrene in a solution of 5.2 parts by weight of potassium hydroxide in 260 parts by weight of water is refluxed under nitrogen for 4 hours. The cooled mixture is extracted with a chloroform-acetic acid solution, the extract washed with potassium bicarbonate solution and with water, dried over anhydrous sodium sulfate, and concentrated to dryness in vacuo. A solution of the residue in 10% benzene in petroleum ether is adsorbed on 300 parts by weight of acid-washed alumina and eluted with 50% benzene in petroleum ether. Recrystallization from acetone petroleum ether yields 3 - methoxy - 18,19 - dinor - 1,3,5(10),16 - pregnatetraen-20-one, M.P. 168–169°, $[\alpha]_D = +112°$.

EXAMPLE 9

*3-methoxy-18-nor-1,3,5(10)-estratrien-17-one*

A solution of 7 parts by weight of 3-methoxy-18,19-dinor-1,3,5(10),16-pregnatetraen-20-one and 15 parts by weight of hydroxylamine hydrochloride in 200 parts by volume of pyridine is heated at 100° for 1½ hours. The reaction mixture is cooled, diluted with water and the resultant precipitate collected by filtration and washed on the filter with water.

A solution of 6.8 parts by weight of the latter precipitate in 50 parts by volume of pyridine is added at 0° to a solution of 20 parts by volume of phosphorous oxychloride in 50 parts by volume of pyridine and the resulting mixture allowed to stand at 0° for 3 hours. It is then added cautiously with stirring to a mixture of 35 parts by volume of concentrated aqueous hydrochloric acid with 200 parts by weight of ice. Stirring is continued for 5 minutes and the precipitate collected by filtration, washed with water, and dissolved in methylene chloride. The organic solution is washed successively with potassium bicarbonate and water, dried over anhydrous sodium sulfate, and evaporated to dryness in vacuo. Chromatography of the residue on silica gel followed by elution with a 5% ethyl acetate-95% benzene solution and recrystallization from methanol affords 3 - methoxy - 18 - nor - 1,3,5(10)-estratrien - 17 - one, M.P. 161–163°; $[\alpha]_D = +188°$.

EXAMPLE 10

3-methoxy-18-nor-1,3,5(10)-estratrien-17-ol

A solution of 7.5 parts by weight of 3-methoxy-18-nor-1,3,5(10)-estratrien-17-one in 1000 parts by volume of ether is added dropwise, at 0°, to a mixture of 10 parts by weight of lithium aluminum hydride and 1000 parts by volume of ether. The reaction mixture is treated cautiously with water in order to decompose the excess hydride, acidified with aqueous hydrochloric acid, then extracted with ether. The organic extract is washed successively with water and aqueous potassium bicarbonate, dried over anhydrous magnesium sulfate, and concentrated to dryness under reduced pressure to afford 3 - methoxy - 18 - nor - 1,3,5(10) - estratrien - 17 - ol. Chromatography of the latter substance on silica gel followed by successive elutions with a 5% ethyl acetate-95% benzene solution yields 3-methoxy-18-nor-1,3,5(10)-estratrien-17$\alpha$-ol, which possesses maxima in the infrared at 3.10, 6.21, and 6.37 microns; and 3-methoxy-18-nor-1,3,5(10)-estratrien-17$\beta$-ol. Recrystallization of the latter compound from benzene-petroleum ether affords the pure substance, M.P. 158–160°.

EXAMPLE 11

3-methoxy-18-nor-2,5(10)-estradien-17-ol

To a mixture of 1250 parts by volume of liquid ammonia and 600 parts by volume of tertiary-butyl alcohol is added a solution of 2.4 parts by weight of 3-methoxy-1,3,5(10)-estratrien-17-ol in 1300 parts by volume of ether. While the mixture is stirred, 25 parts by weight of lithium wire is added portionwise over a period of one hour. Stirring is continued for 2 hours, then 80 parts by volume of methanol added; and the resulting mixture is distilled to remove ammonia, treated cautiously with water, and extracted with benzene. The benzene extract is washed with water, dried over anhydrous magnesium sulfate and concentrated to dryness in vacuo to afford 3-methoxy-18-nor-2,5(10)-estradien-17-ol. It exhibits maxima in the infrared at 2.97, 5.88, and 5.99 microns. This substance may be recrystallized from methanol to yield the pure material.

EXAMPLE 12

17-hydroxy-18-norestr-5(10)-en-3-one

To a refluxing solution of 2 parts by weight of 3-methoxy-18-nor-2,5(10)-estradien-17-ol in 280 parts by volume of methanol is added a solution of one part by weight of oxalic acid in 10 parts by weight of water. Refluxing is continued for 10 minutes, then the mixture cooled and poured into water. The resulting precipitate is collected by filtration to afford 17-hydroxy-18-norestr-5(10)-en-3-one. Its infrared absorption spectrum possesses maximum at 2.91 and 5.84 microns.

EXAMPLE 13

17-hydroxy-18,19-dinorandrost-4-en-3-one

To a refluxing solution of 2 parts by weight of 17-hydroxy-18-norestr-5(10)-en-3-one in 160 parts by volume of ethanol is added 10 parts by volume of concentrated hydrochloric acid and the refluxing continued for one hour. The precipitated crude product is collected by filtration and dried to yield 17-hydroxy-18,19-dinorandrost-4-en-3-one. Recrystallization from petroleum ether affords 17$\alpha$-hydroxy-18,19-dinorandrost-4-en-3-one, which exhibits maxima in the infrared at 2.92, 6.02, and 6.22 microns; and 17$\beta$-hydroxy-18,19-dinorandrost-4-en-3-one, M.P. 197–199°; $[\alpha]_D = +68°$.

EXAMPLE 14

18,19-dinorandrost-4-ene-3,17-dione

To a solution of one part by weight of 17-hydroxy-18,19-dinorandrost-4-en-3-one and 300 parts by volume of acetone is added dropwise, at 5°, 2 parts by weight of a 4 Normal chromium trioxide solution in aqueous sulfuric acid. The reaction mixture is stirred for 5 minutes longer, then diluted with water and extracted with benzene. The benzene extract is washed successively with water and aqueous potassium bicarbonate, then evaporated to dryness in vacuo to yield 18,19-dinorandrost-4-ene-3,17-dione. Its infrared absorption spectrum possesses maxima at 5.78, 6.02, and 6.18 microns.

EXAMPLE 15

17-acetoxy-18,19-dinorandrost-4-en-3-one

A mixture of 5 parts by weight of 17-hydroxy-18,19-dinorandrost-4-en-3-one, 50 parts by volume of acetic anhydride and 100 parts by volume of pyridine is warmed on a steam bath to achieve solution, then allowed to stand at room temperature for 16 hours. The reaction mixture is diluted with water, and the resulting precipitate collected by filtration and dried to afford 17-acetoxy-18,19-dinorandrost-4-en-3-one, which possesses maxima in the infrared at 5.77, 6.02, 6.18, and 7.95 microns.

By substituting an equivalent quantity of butyric anhydride and otherwise proceeding according to the herein described processes, 17-butyroxy-18,19-dinorandrost-4-en-3-one, which exhibits maxima in its infrared absorption spectrum at 5.77, 6.02, 6.18, and 7.95 microns, is obtained.

What is claimed is:

1. A compound of the structural formula

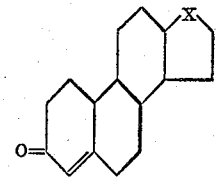

wherein X is selected from the group consisting of carbonyl, hydroxymethylene, and (lower alkanoyl)oxymethylene radicals.

2. 17-hydroxy-18,19-dinorandrost-4-en-3-one.
3. 18,19-dinorandrost-4-ene-3,17-dione.
4. 17-acetoxy-18,19-dinorandrost-4-en-3one.

References Cited in the file of this patent

UNITED STATES PATENTS 2,649,400    Murray et al. _____ Aug. 18, 1953

OTHER REFERENCES

Wilds et al.: J.A.C.S., vol. 75, pp. 5366–69 (1953).
Nelson et al.: J.A.C.S., vol. 79, pp. 6313–20 (1957).